3,032,417
IMPROVEMENT IN WINE TASTE
Matthew J. Lynch, Waukegan, Ill., assignor to Abbott Laboratories, North Chicago, Ill., a corporation of Illinois
No Drawing. Filed May 18, 1960, Ser. No. 29,812
6 Claims. (Cl. 99—36)

The present invention is concerned with the improvement of the taste of wine. In particular, it is concerned with bringing out flavor in traditionally dry wines and improving them in flavor and bouquet.

Dry table wines, not including vermouth and sparkling wines, are consumed in the United States in only half the quantity of dessert wines, which possess varying degrees of sweetness. It is known that the flavor of wines depends largely on the origin and the climatic conditions of the season in which the grapes are grown. Some areas almost consistently produce acceptable wines every year, but other areas produce wines too dry or without sufficient flavor to be used as table wines. The latter ones as well as the natural wines from areas with more sun during the grape growing season but in years where the average amount of sunshine is not obtained, can not be used as ordinary table wines without artificial improvement. These wines usually are used more as cooking wines, selling for much less than table wines in general. Thus, certain vine crops result in great financial losses and tend to impair the reputation of the geographical origin of the wine even for subsequent climatically better seasons. It is therefore an object of the present invention to improve inferior wines. It is another object to bring out the flavor of unacceptable table wines. It is a further object to improve unacceptable dry wines to table wines with a minimum of additives.

These and other objects are accomplished by adding to the unacceptably dry wine a combination of cyclohexylsulfamic acid and citric acid, the total amount of the additives being within the range of 0.4–0.7% by weight per volume and with a weight ratio of cyclohexylsulfamic acid to citric acid between 2:4 and 3:2.

It is surprising to find that the addition of citric acid to these unacceptably dry wines improves their taste and flavor, since these wines ordinarily are very acidic. The other additive, cyclohexylsulfamic acid, is an intermediate in the preparation of sodium and calcium cyclohexylsulfamate but as such is not a sweetener although its taste is described as sweetish but predominantly sour. It is therefore quite unexpected that these two acidic additives alone change a wine from one which is unacceptable for drinking to an excellent table wine, particularly when it is considered that only very minute amounts of the additives are necessary. When these additives are added in amounts near the lower recommended level, they do not alter the character of the wine but bring out its natural flavor, improving its taste but still leaving it a dry wine. At or near the higher recommended total amount of additives, the wine becomes somewhat closer to a sweet wine but is still considered a table wine and not a sweet after-dinner wine, even if the ratio of additives is three parts cyclohexylsulfamic acid to two parts of citric acid.

To better illustrate the foregoing description, the following examples are given. However, it is to be understood that these examples are illustrations only and do not constitute the only embodiments of the present invention. In these examples, the wine tastes are judged by a taste panel composed of ten experienced tasters that preferred dry wines over sweet wines. These selected subjects were never told in advance what the samples were but were given 2, 3, or 4 samples to taste at one time to choose the most pleasant tasting one. In addition, each taste panel member approached the test individually to exclude all possible prejudices.

*Example 1*

Four samples were tested by the above taste panel, these samples were:

(a) A dry white wine containing 12% w./v. alcohol and being marketed as cooking wine.
(b) The same wine as in (a) but sweetened with 6% w./v. sugar and 0.7% w./v. citric acid.
(c) The same wine as in (a) sweetened by the addition of 0.2% w./v. sodium cyclamate and 0.7% w./v. citric acid.
(d) The same wine as in (a) containing 0.2% w./v. cyclohexylsulfamic acid and 0.35% w./v. citric acid.

All ten members of the taste panel individually described the last sample as the best one of the four and commented that the wine of sample (d) was in their judgment an elegant table wine. Samples (b) and (c) were reported to be about equivalent in taste to each other but still not acceptable as table wines.

The sample (d) is also described as still being dry but yet very pleasantly sour sweet.

*Example 2*

To the dry, flat cooking white wine described in Example 1 0.2% w./v. of cyclohexylsulfamic acid is added. In various test samples, citric acid is added to the cyclohexylsulfamic acid containing wine, the citric acid varying in amounts from 0.1 to 0.7% w./v. The taste panel's decision shows the best wines being within the range of from 0.15 to 0.4% w./v. citric acid addition.

*Example 3*

To the wine of Example 1(a) is added 0.3% w./v. citric acid as an artificial additive and the amount of cyclohexylsulfamic acid is varied between 0.05% and 0.7% w./v.

According to the taste panel, those samples containing 0.15–0.4% w./v. cyclohexylsulfamic acid together with the 0.3% w./v. citric acid are designated as very acceptable, flavorful, dry table wines.

*Example 4*

A flat, sour-tasting red cooking wine which is also described as having some bitterness is used for testing the findings of Examples 1–3. By adding 0.2% w./v. of cyclohexylsulfamic acid and 0.3% w./v. of citric acid, the wine is reported by the taste panel as being of excellent quality although still dry.

By adding 0.2% w./v. cyclohexylsulfamic acid and 0.35% w./v. citric acid to a sparkling burgundy having an inferior taste, an excellent table wine is obtained. The same findings are reported by the taste panel when a cheap, flat, very dry champagne is treated in the same fashion.

The above examples demonstrate the wide applicability of the present invention and the excellent resulits obtained in improving flavor and bouquet of cheap sour and/or bitter cooking wines. These results are quite surprising considering that such minute quantities are needed as additives. It is further surprising that addition of citric acid and cyclohexylsulfamic acid even improves a sour wine, although both additives are very acidic. Particularly striking is the mild sweetening effect of these combined additives since no sweetening is actually added: cyclohexylsulfamic acid is not a sweetener by itself.

Others may practice the invention in any of the numerous ways which will be suggested by this disclosure to one skilled in the art. All such practice of the invention is considered to be a part hereof provided it falls within the scope of the appended claims.

I claim:
1. The method of improving flavor and taste of inferior wines comprising the step of adding thereto 0.4–0.7% w./v. of a combination of cyclohexylsulfamic acid and citric acid, the ratio between said cyclohexylsulfamic acid and citric acid being selected within the range of from 2:4 to 3:2.
2. The method of improving flavor and taste of inferior wines comprising the step of adding thereto about 0.2% w./v. of cyclohexylsulfamic acid and about 0.15–0.4% w./v. citric acid.
3. The method of improving flavor and taste of inferior wines comprising the step of adding thereto about 0.3% w./v. of citric acid and about 0.15–0.4% w./v. of cyclohexylsulfamic acid.
4. A table wine containing therein as an artificial additive a combination of 0.4–0.7% w./v. of cyclohexylsulfamic acid and citric acid, the ratio between said cyclohexylsulfamic acid and citric acid being selected within the range of from 2:4 to 3:2.
5. A table wine containing therein as an artificial additive about 0.2% w./v. of cyclohexylsulfamic acid and about 0.15–0.4% w./v. of citric acid.
6. A table wine containing therein as an artificial additive about 0.3% w./v. of citric acid and about 0.15–0.4% w./v. of cyclohexylsulfamic acid.

References Cited in the file of this patent

UNITED STATES PATENTS

| | | |
|---|---|---|
| 2,761,783 | Ferguson | Sept. 4, 1956 |
| 2,865,756 | Nierory | Dec. 23, 1958 |

OTHER REFERENCES

Cruess, W. V.: "The Principles and Practice of Wine Making," published by the Avi Publishing Co., Inc., N.Y., pp. 142, 149.

"The Condensed Chemical Dictionary," 1956, published by the Rheinhold Publishing Corp., N.Y., p. 84.